Dec. 6, 1932.    G. McK. FITTS    1,890,031
BRAKE
Filed Dec. 19, 1928    2 Sheets-Sheet 1

Inventor
George M. Fitts
By Howard F. Bresee
L. Karlton Mosteller
Attorneys

Dec. 6, 1932.  G. McK. FITTS  1,890,031
BRAKE
Filed Dec. 19, 1928  2 Sheets-Sheet 2
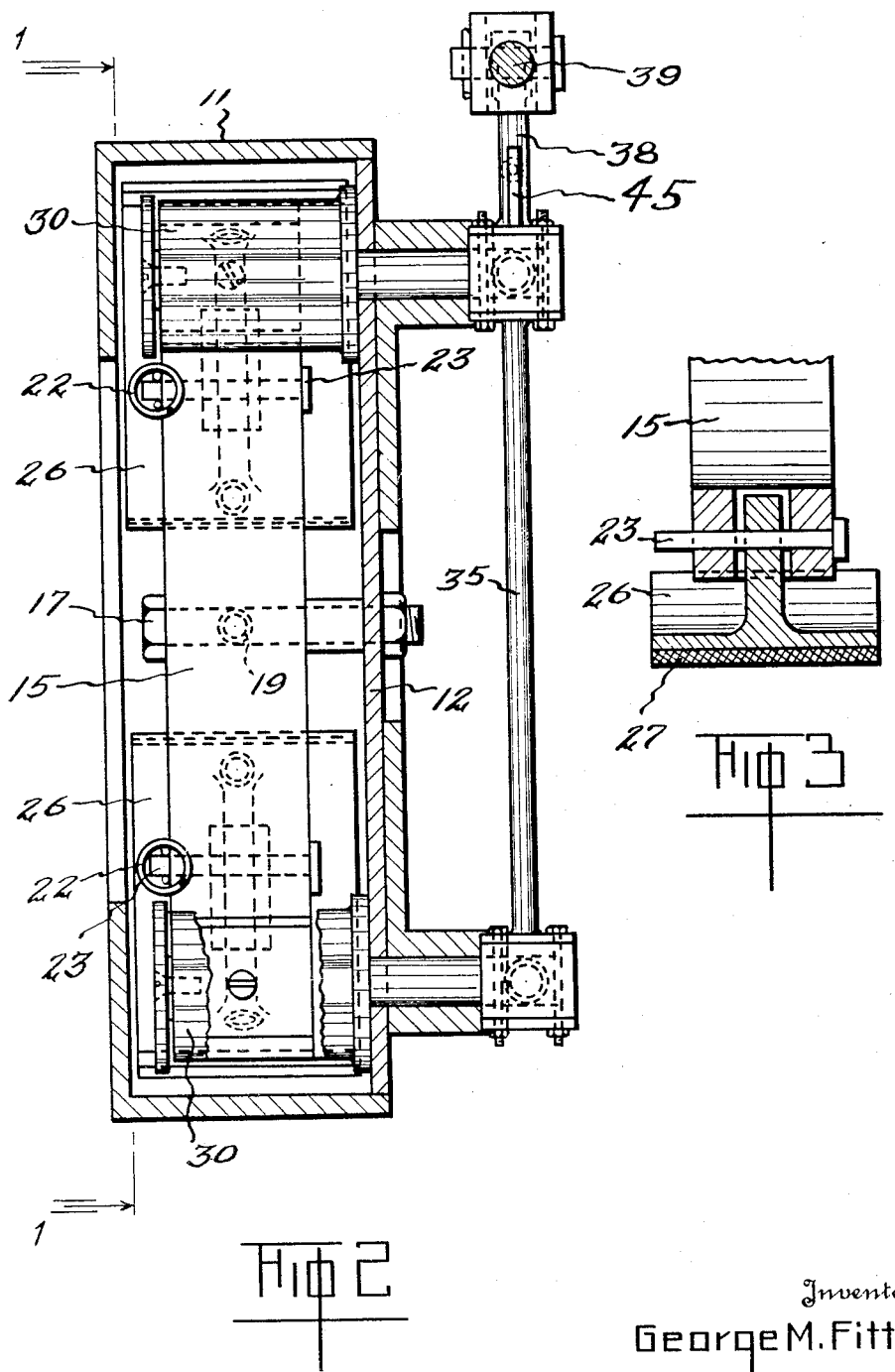
Inventor
George M. Fitts
By Howard F. Bresee
L. Karlton Mosteller
Attorneys Patented Dec. 6, 1932

1,890,031

UNITED STATES PATENT OFFICE

GEORGE McKINLEY FITTS, OF SILER CITY, NORTH CAROLINA

BRAKE

Application filed December 19, 1928. Serial No. 326,969.

This invention relates to brakes, and particularly to brakes of the internal expanding type.

It is an object of the invention to provide a brake of this type in which actuating means expands brake shoes against a brake drum in such a manner as to produce the same amount of pressure at all points of contact between said brake shoes and said brake drum.

It is a further object of the invention to provide a series of floating brake shoes each of which is provided with an adjustable tension spring at each end thereof.

Further objects of the invention will appear from the following description taken in connection with the accompanying drawings, which illustrate a preferred embodiment of the invention, and in which:

Fig. 2 is an axial sectional view of the same mechanism taken on the line 2—2 of Fig. 1, and Fig. 3 is a fragmentary view on line 3—3 of Fig. 1 illustrating the attachment of one of the brake shoes to its shoe carrier.

Figure 1:
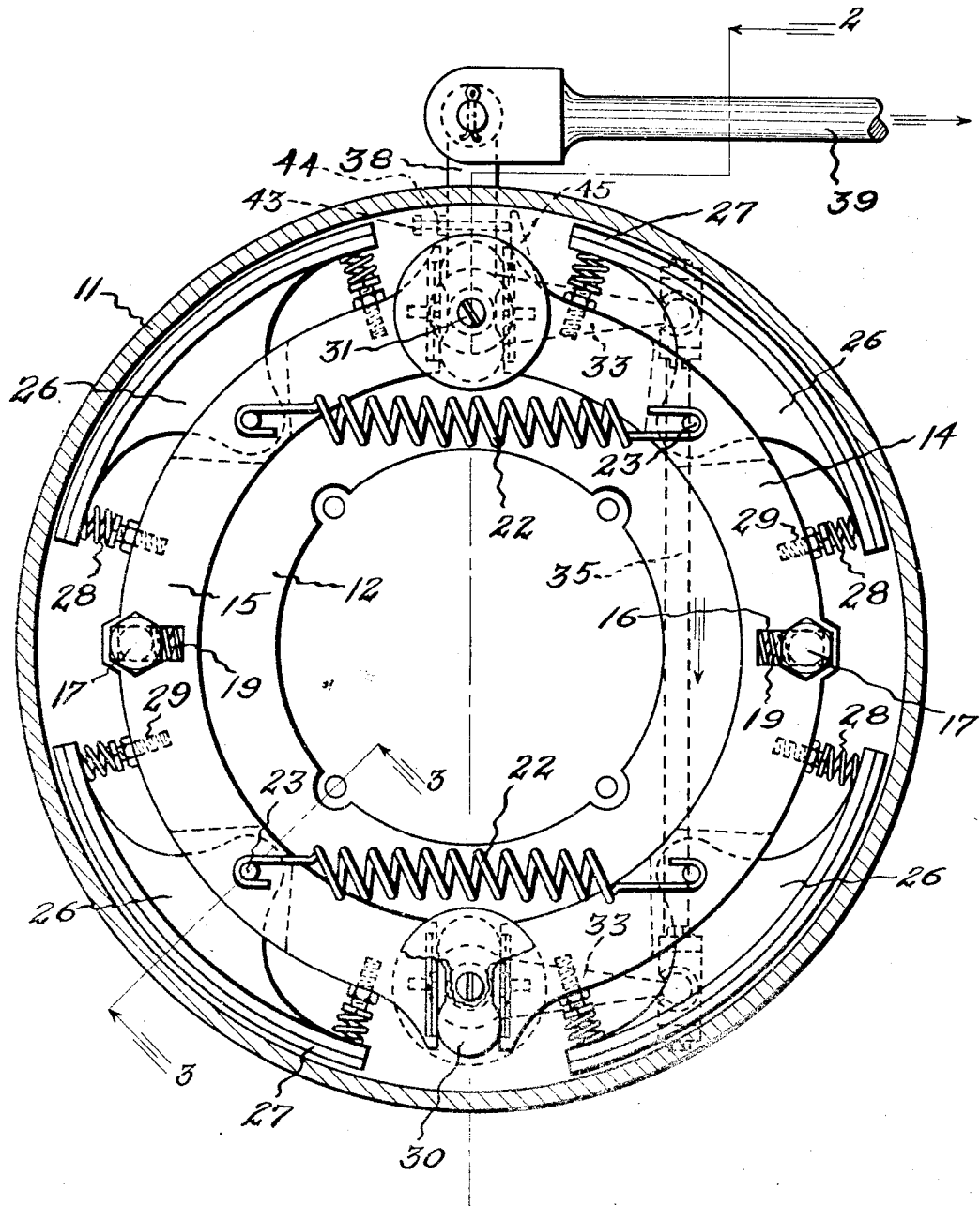
Fig. 1 is a vertical section through brake mechanism embodying the present invention, the section being taken in the plane at right angles to the axis of the brake drum.

Referring in detail to the accompanying drawings, the invention includes a brake drum 11, within which is located a stationary brake support 12. Between the drum and the support are arranged two semicircular shoe carriers 14 and 15, each of which is slotted, as at 16, for cooperation with a bolt 17 passing through the slot and fixed in the central support 12 and serving to guide the brake shoe carriers in their movement toward and away from the brake drum.

Within each slot 16 is located a coil spring 19, which bears at one end against the bolt 17 and at its other end against the inner end of the slot 16. The springs 19 are under compression and therefore serve to urge the brake shoe carriers constantly toward each other, that is, constantly away from the brake drum.

Coil connecting springs 22 connect pins 23 passing through the brake shoe carriers and also serve to urge the carriers constantly toward each other. The pins 23 (see Fig. 3) also serve as pivots for the brake shoes 26, carrying linings 27 adapted to be brought into contact with the brake drum 11 when the brake shoe carriers are moved for braking action, as hereinafter described. At each end of each pivoted brake shoe 26 a coil compression spring 28 is provided, which bears at one end against the brake shoe and at its other end against an adjusting bolt 29 threaded into the brake shoe carrier. These compression springs 28 serve as equalizing means and aid in insuring that the pressure at all points along each brake shoe will be the same during its braking action against the brake drum.

Between adjacent ends of the semicircular brake shoe carriers 14 and 15, a double acting cam 30 is provided, which is pivotally mounted by a threaded bolt 31 for partial rotation on the brake support 12. Each cam 30 is provided with an actuating lever 33, and the levers 33 are connected by a link 35 so that upon operation of one of the cams by its lever 38 the other cam will also be actuated in unison therewith. A link 39 connects the lever 38 with any suitable hand brake lever or foot brake pedal. An adjusting screw 43 passing through lever 38 and having a lock nut 44 may be used to take up and correct any slight wear, by bearing against a lug 45 on lever 33.

From the foregoing description it will be evident that actuation of the cams 30 forces apart the two semicircular brake shoe carriers and that by this movement the brake shoes 26 are forced against the brake drum 11, the pressure over their bearing surfaces being equalized by springs 28 and 19.

Various changes may be made in the embodiment above described without departing from the invention as defined by the following claims.

I claim:

1. A brake comprising a brake drum, a brake support therewithin, a pair of semicircular shoe carriers, guide means on said support engaging a portion intermediate of the ends of the carriers for guiding said carriers in movement toward and away from said brake drum, springs bearing on said guide means and said carriers and urging said carriers away from said brake drum, springs connecting said semicircular shoe carriers urging them toward each other, cams between said carriers, actuating mechanism for moving said cams simultaneously and thereby moving said carriers away from each other and toward said brake drum, a pair of brake shoes pivotally mounted on each of said shoe carriers and urged against said brake drum by operation of said cam means, and a pair of coiled equalizing springs between each brake shoe and its carrier.

2. A brake comprising a brake drum, a brake support therewithin, a pair of semicircular shoes carriers, guide means on said support engaging a portion intermediate of the ends of the carriers for guiding said carriers in movement toward and away from said brake drum, springs bearing on said guide means and said carriers and urging said carriers away from said brake drum, springs connecting said semicircular shoe carriers urging them toward each other, cams between said carriers, actuating mechanism for moving said cams simultaneously and thereby moving said carriers away from each other and toward said brake drum, a pair of brake shoes pivotally mounted on each of said shoe carriers and urged against said brake drum by operation of said cam means, a pair of coiled equalizing springs between each brake shoe and its carrier, and adjusting means on the carrier for varying the tension of the equalizing springs.

In testimony whereof I affix my signature.

GEORGE McKINLEY FITTS.